(12) United States Patent
Tao et al.

(10) Patent No.: US 11,945,434 B2
(45) Date of Patent: Apr. 2, 2024

(54) DELAY DECISION MAKING FOR AUTONOMOUS DRIVING VEHICLES IN RESPONSE TO OBSTACLES BASED ON CONFIDENCE LEVEL AND DISTANCE

(71) Applicant: Baidu USA LLC, Sunnyvale, CA (US)

(72) Inventors: Jiaming Tao, Sunnyvale, CA (US);
Jiaxuan Xu, Sunnyvale, CA (US);
Jiacheng Pan, Sunnyvale, CA (US);
Jinyun Zhou, Sunnyvale, CA (US);
Hongyi Sun, Sunnyvale, CA (US);
Yifei Jiang, Sunnyvale, CA (US);
Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 133 days.

(21) Appl. No.: 16/678,387

(22) Filed: Nov. 8, 2019

(65) Prior Publication Data

US 2021/0139022 A1     May 13, 2021

(51) Int. Cl.
*B60W 30/095*     (2012.01)
*B60W 30/09*     (2012.01)
*B60W 30/18*     (2012.01)
*G05D 1/00*     (2006.01)
*G06V 20/58*     (2022.01)

(52) U.S. Cl.
CPC ........ *B60W 30/0956* (2013.01); *B60W 30/09* (2013.01); *B60W 30/181* (2013.01); *G05D 1/0088* (2013.01); *G06V 20/58* (2022.01); *B60W 2554/00* (2020.02)

(58) Field of Classification Search
CPC ......... B60W 30/0956; B60W 2554/00; B60W 30/09; G05D 1/0088
See application file for complete search history.

(56) References Cited

U.S. PATENT DOCUMENTS

| | | |
|---|---|---|
| 2015/0210280 A1* | 7/2015 | Agnew ............... B60W 10/192 |
| | | 701/70 |
| 2017/0057474 A1* | 3/2017 | Zeng ................... B60T 8/17558 |
| 2018/0267149 A1* | 9/2018 | Polonsky ................ G01S 17/04 |
| 2019/0187720 A1* | 6/2019 | Fowe ...................... G06N 20/00 |
| 2021/0055733 A1* | 2/2021 | Beller ............. B60W 30/18154 |
| 2021/0089040 A1* | 3/2021 | Ebrahimi Afrouzi ....................... |
| | | G05D 1/0248 |
| 2022/0276650 A1* | 9/2022 | Inam ........................ B25J 9/162 |

\* cited by examiner

*Primary Examiner* — Jelani A Smith
*Assistant Examiner* — Toya Pettiegrew
(74) *Attorney, Agent, or Firm* — WOMBLE BOND DICKINSON (US) LLP

(57) ABSTRACT

In one embodiment, a process is performed during controlling Autonomous Driving Vehicle (ADV). A confidence level associated with a sensed obstacle is determined. If the confidence level is below a confidence threshold, and a distance between the ADV and a potential point of contact with the sensed obstacle is below a distance threshold, then performance of a driving decision is delayed. Otherwise, the driving decision is performed to reduce risk of contact with the sensed obstacle.

21 Claims, 8 Drawing Sheets

DELAY DECISION MAKING FOR AUTONOMOUS DRIVING VEHICLES IN RESPONSE TO OBSTACLES BASED ON CONFIDENCE LEVEL AND DISTANCE

TECHNICAL FIELD

Embodiments of the present disclosure relate generally to operating autonomous vehicles. More particularly, embodiments of the disclosure relate delaying decision making in response to obstacles based on confidence level and distance.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

In some cases, obstacles (either moving or stationary) are sensed in the environment of the autonomous driving vehicle (ADV), that may require the ADV to react. For example, an obstacle such as a vehicle can be stopped in front of the ADV or turning into the same lane as the ADV. The ADV can make driving decisions such as adjusting the path, slowing down, or stopping, due to the obstacle. In some cases, however, there is uncertainty as to where the obstacle will move to, or whether or not the obstacle is actually there. The ADV might benefit from delaying such a reaction, until there is more certainty.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
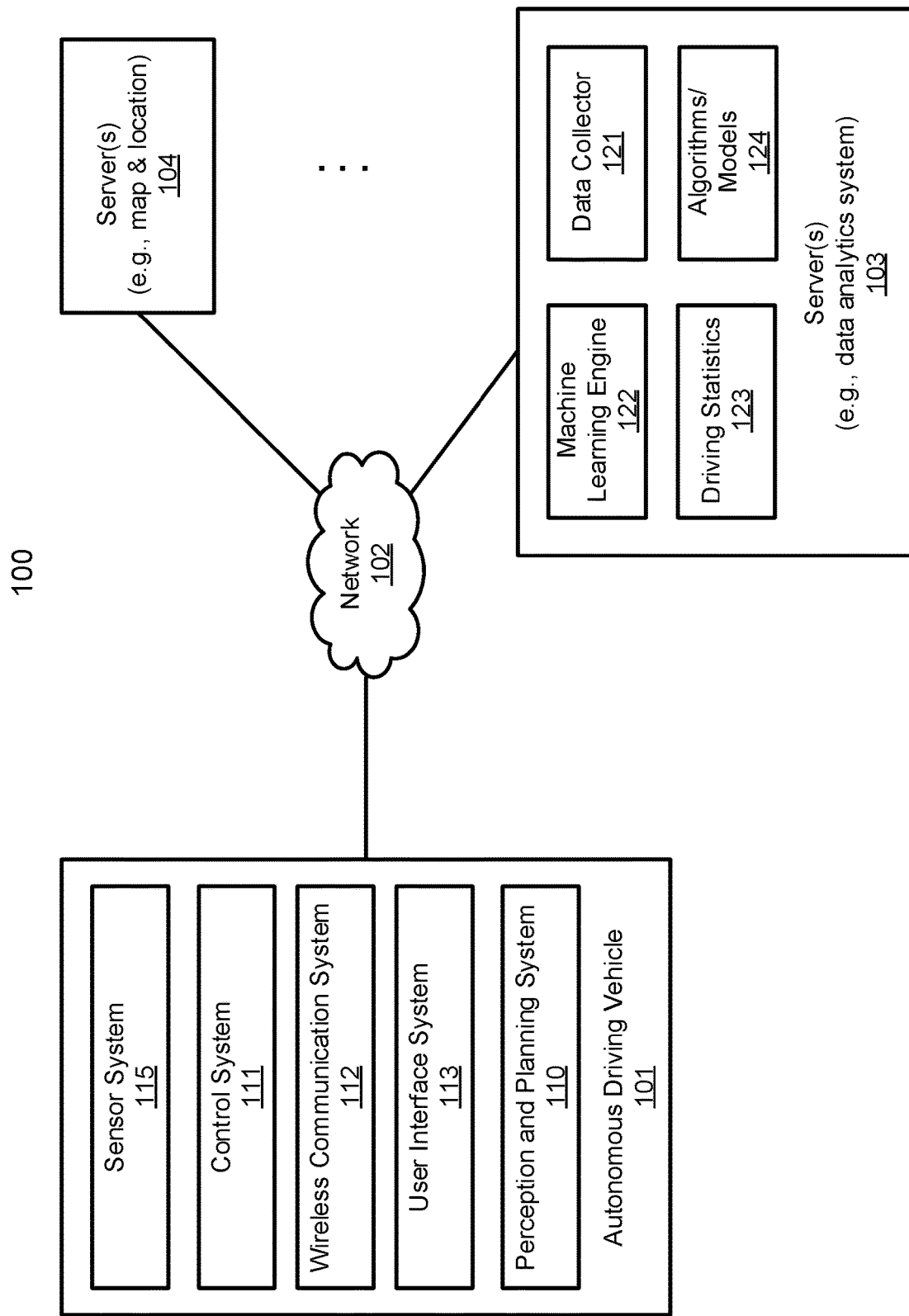
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Data is generated from sensors of the ADV that describe a current status of the obstacle, for example, a speed, heading, acceleration, location, or recognized type of the obstacle. A confidence score (also referred to as a confidence level) can be calculated for obstacles (and/or the associated data) to score how confident the ADV is in a predicted path of an obstacle, and/or to score how reliable sensing of the obstacle is.

The ADV can use the confidence score or scores to decide whether or not to make a driving decision, in response to the obstacle. For example, if the ADV has very low confidence that an obstacle will interfere with the ADV's path, then the ADV may wish to continue on the current path, rather than adjust path, slow down, or stop, at least until the confidence is higher. This can avoid unnecessary delays and disturbances to the driving experience. Safety, however, can become an issue if the ADV delays response to obstacles due to low confidence scores in an indiscriminate manner. Therefore, it is desirable to address safety concerns caused by obstacles, but also reduce unnecessarily delaying and disturbing the driving experience.

According to some embodiments, a process can be performed during driving of an autonomous driving vehicle that determines a confidence score that is associated with a sensed obstacle, such as but not limited to a vehicle (e.g., car, truck, motorcycle, or train), a pedestrian, debris, a tree, a structure, etc. The sensed obstacle can potentially interfere with the ADV's current path. In other words, there is a potential point of contact between the ADV and the obstacle. If a) the confidence score is below a confidence threshold, and b) a distance between the ADV and the potential point of contact with the sensed obstacle is below a distance threshold, then the ADV can delay reacting to the obstacle. Otherwise, the ADV can react to the obstacle, for example, by slowing down, stopping, overtaking the obstacle, or steering away from the obstacle, to reduce risk of contact with the sensed obstacle.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
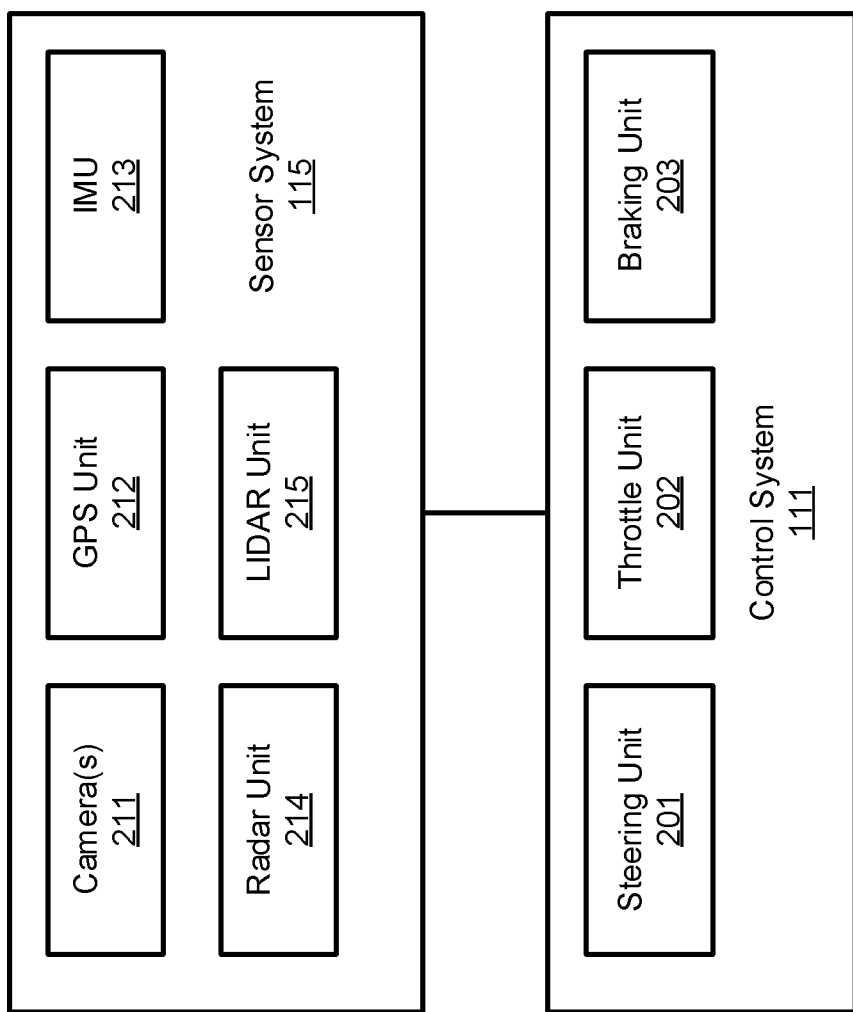
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In some embodiments, any combination of the sensors of the sensor system (e.g., the cameras, scanners, and/or detectors) can gather data used to detect obstacles.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using Wi-Fi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MP OI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. For example, algorithms 124 may include algorithms or functions to calculate the confidence scores for the current status of an obstacle, a trajectory predicted for the obstacle, and trajectory points of the trajectory, including delaying certain decisions under certain circumstances, which will be described further below. Algorithms 124 can then be uploaded on ADVs to be utilized during autonomous driving in real-time.

Figure 3A:
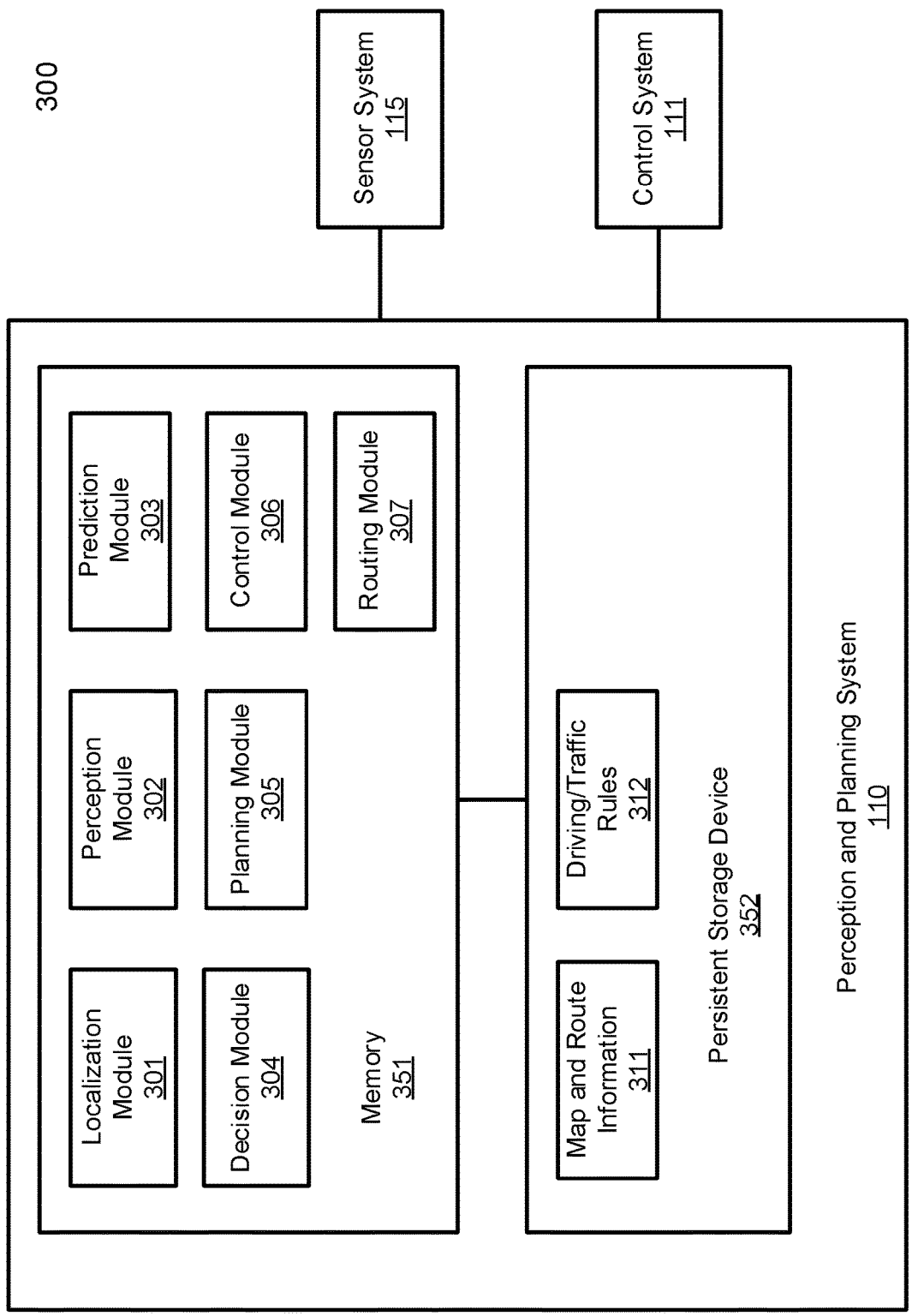
FIGS. 3A-3B are block diagrams illustrating an example of a perception and planning system used with an autonomous vehicle according to one embodiment.
Figure 3B:
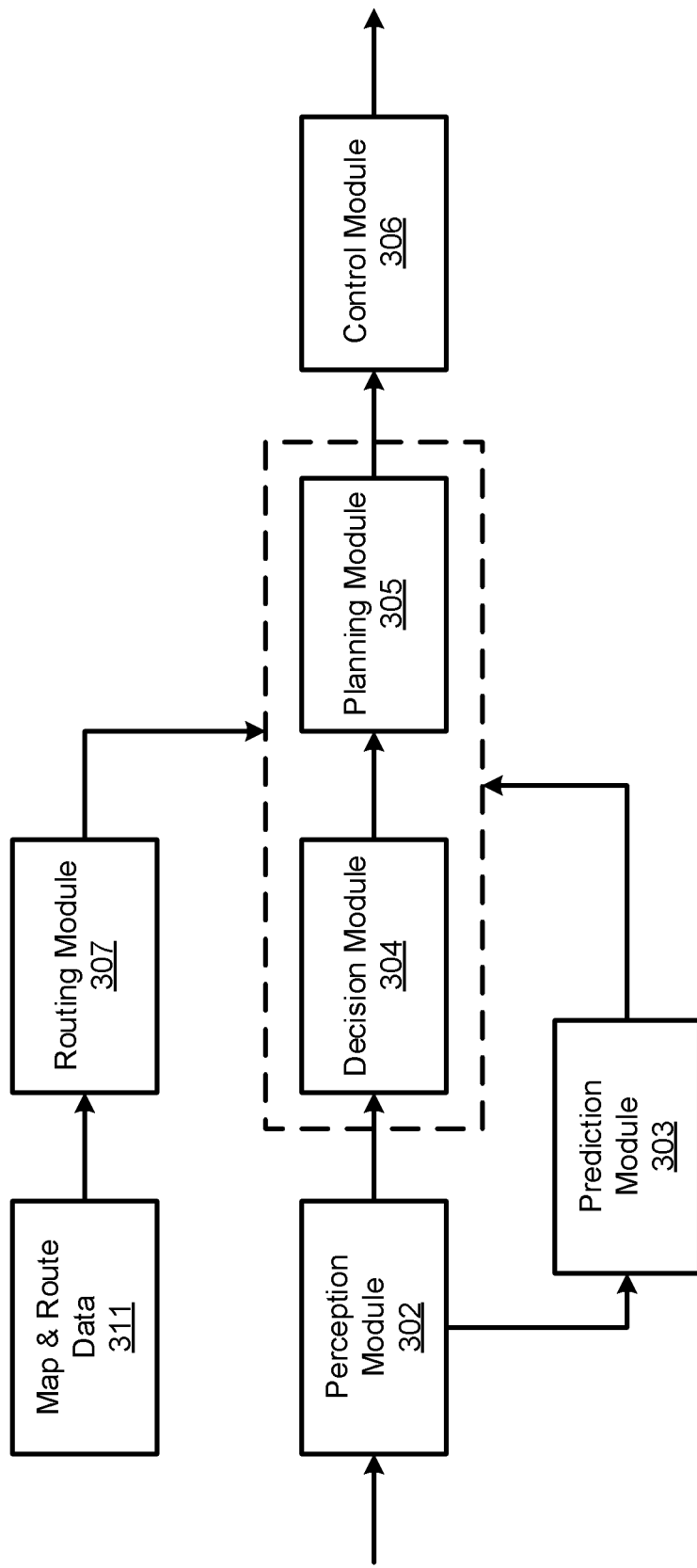

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or other obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

In some aspects, prediction module generates a predicted trajectory of an obstacle that predicts a path of the moving obstacle, at least in an area that is deemed relevant to a current path of the ADV. The predicted trajectory can be generated based the current status of the moving obstacle (e.g., speed, location, heading, acceleration, or a type of the moving obstacle), map data, and traffic rules.

For example, the ADV may recognize the obstacle as a vehicle that is sensed to be traveling in a driving lane based on the obstacle's heading and location that is referenced to map data that contains lane location and orientation that corroborates that the obstacle, based on the heading and location of the obstacle, appears to be driving in the driving lane. Suppose that the map data indicates that this is a right turn only lane. Based on traffic rules (e.g., an obstacle of type 'vehicle' in a right turn only lane must turn right), a trajectory can be generated that defines movement of the obstacle. The trajectory can include coordinates and/or a mathematical representation of a line that predicts the obstacle's movement.

In some embodiments, when predicting a movement trajectory of an obstacle, a prediction system or module divides the trajectory prediction of an obstacle into two parts: 1) a longitudinal movement trajectory generation and 2) a lateral movement trajectory generation. These parts can be combined to form the predicted trajectory of the obstacle.

In some embodiments, the lateral movement trajectory (also simply referred to as a lateral trajectory) is generated including optimizing the trajectory using a first polynomial function. The longitudinal movement trajectory (also simply referred to as a longitudinal trajectory) is generated including optimizing the trajectory using a second polynomial function. The optimizations are performed based on a) current states of the obstacle as initial states and b) predicted end states of the obstacle as a set of constraints, such that the trajectories are smoothly aligned with at least a current heading direction of the obstacle. The end states are determined in view of the shape of a lane which the obstacle is predicted to move onto. Once the longitudinal movement trajectory and the lateral movement trajectory have been defined and generated, a final predicted trajectory for the obstacle can be determined by combining the longitudinal movement trajectory and the lateral movement trajectory. As a result, the predicted trajectory of the obstacle is more accurate based on the current states of the obstacle and the shape of the lane.

According to some aspects, an obstacle is predicted to move from a starting point to an end point based on perception data that perceives a driving environment surrounding an ADV that is driving within a lane. The boundaries of the driving environment are dependent on the range of the various sensors of the ADV, which can vary. A longitudinal movement trajectory from the starting point to the end point is generated in view of a shape of the lane. A lateral movement trajectory from the starting point to the end point is generated, including optimizing a shape of the lateral movement trajectory using a first polynomial function. The longitudinal movement trajectory and the lateral movement trajectory are then combined to form a final predicted trajectory that predicts how the obstacle is to move. A path is generated to control the ADV to move in view of the predicted trajectory of the obstacle, for example, to avoid the collision with the obstacle.

The longitudinal movement trajectory and the lateral movement trajectory are optimized to generate smooth trajectories in view of the current heading direction of the obstacle. The first polynomial function includes a quintic polynomial function. In optimizing the lateral movement trajectory, in one embodiment, a set of initial lateral states (also referred to as lateral initial states) associated with the obstacle is determined based on the current states of the obstacle (e.g., position, speed, heading direction). A set of end lateral states (also referred to as lateral end states) is also determined based on the current states of the obstacle. The initial lateral states and the end lateral states are utilized as a set of constraints to be satisfied by the first polynomial function to optimize the lateral moving trajectory.

According to some aspects, in optimizing the longitudinal movement trajectory, a second polynomial function such as a quartic polynomial function is utilized. A set of initial longitudinal states and end longitudinal states (also referred to as longitudinal initial states and longitudinal end states) are determined based on the current states of the obstacle. The initial longitudinal states and end longitudinal states are utilized as a part of a set of constraints for optimizing using the second polynomial function.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
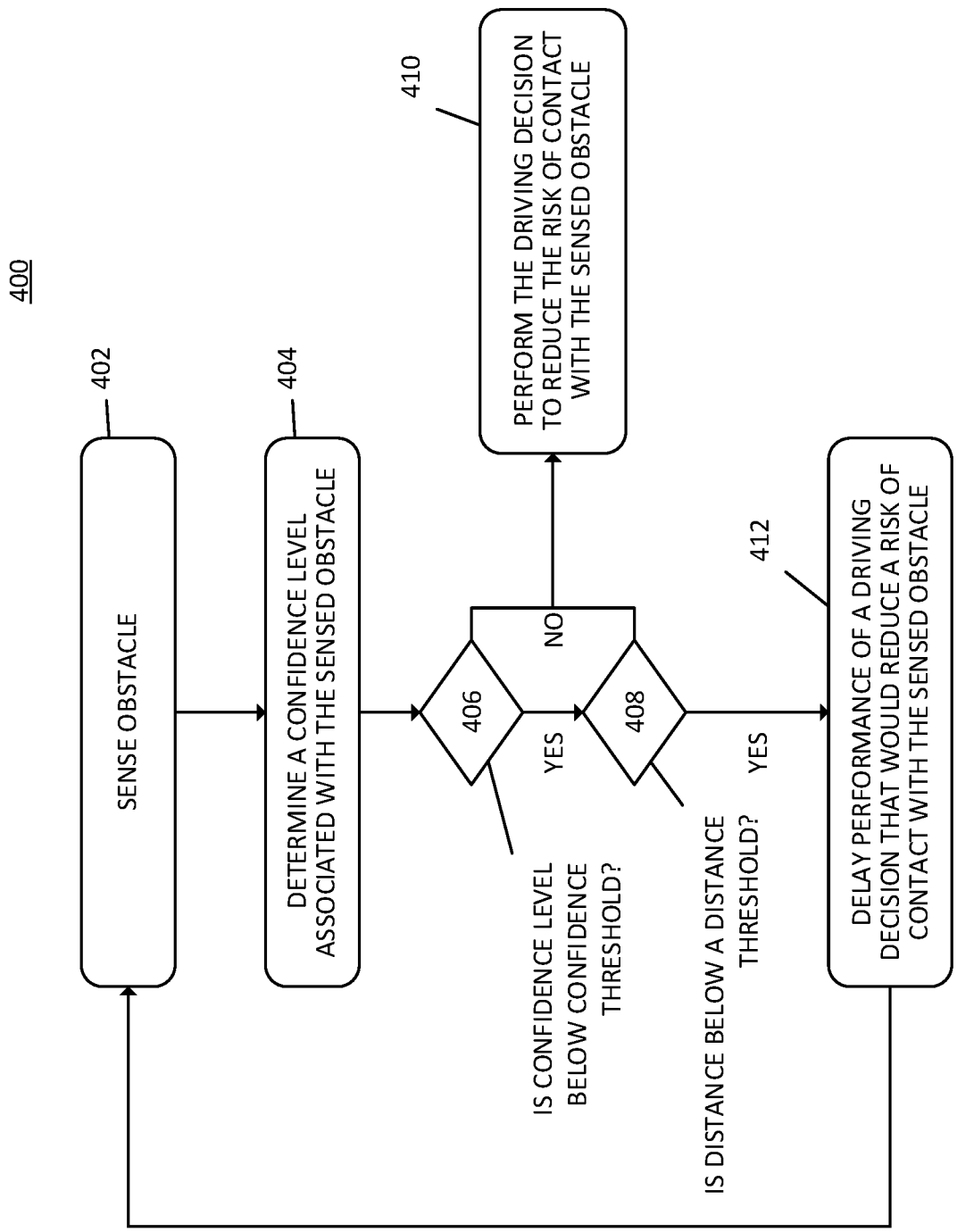
FIG. 4 shows a process for delaying performance of a driving decision according to some embodiments.

Referring to FIG. 4, a process 400 is shown that is performed during driving of an autonomous driving vehicle (ADV). Such a process can improve planning decisions by safely delaying reaction of the ADV to obstacles with low confidence score. At block 402, an obstacle is detected based on sensor data obtained from one or more sensors such as those described above. The detection can be performed by perception module 302 and sensor system 115 of the ADV. Obstacles can include objects such as, but not limited to, other vehicles, pedestrians, debris, structures and cyclists. The obstacles can be stationary or static obstacle (e.g., stopped) or moving or dynamic obstacle.

At block 404, the process includes determining a confidence score associated with the sensed obstacle. The confidence score can be a value that represents how confident the ADV is of the sensing of the obstacle, and/or, in the case of a moving obstacle, how confident the ADV is of where the obstacle is going to move to. This value can be numeric, a percentage, a symbol, a category (e.g., low, medium, high), etc.

For stationary obstacles, a confidence score can be associated with a current status of the obstacle. The current status can include a speed, a heading, a location, an acceleration, and/or a type of the obstacle (e.g., a vehicle, a pedestrian, a cyclist, a tree, debris, etc.). For moving obstacles, a confidence score can be associated with a predicted trajectory of the obstacle. The confidence score of the predicted trajectory represents how confident the ADV is that the obstacle will take that particular trajectories. Confidence scores can be determined based on one or more factors which are discussed in other sections.

At block 406, the process includes determining if the confidence score of the obstacle is below a confidence threshold. If the confidence score of the obstacle is below the threshold, which indicates that there is either a) insufficient confidence in the sensing of the obstacle, or b) insufficient confidence in the obstacle's predicted trajectory, then the process can proceed to block 408. If the confidence score satisfies the confidence threshold, this indicates to the ADV that there is sufficient confidence that the obstacle might interfere with the ADV, in which case, the process proceeds to block 410.

At block 408, the process includes determining whether a distance between the ADV and a potential point of contact with the sensed obstacle is below a distance threshold (e.g., 10 meters, 15 meters, 20 meters, etc.). The distance and distance threshold can be a measurement of length along a path of the ADV between the ADV and a potential point of contact with the obstacle.

For moving obstacles, the potential point of contact can be determined based on where a trajectory of the obstacle and the ADV's path intersect (or come within a threshold proximity to each other). For stationary obstacles, the potential point of contact is where the sensed obstacle is located. A distance threshold can be determined to reduce risk of contact (e.g., based on deceleration, steering, and braking capabilities of the ADV) through routine test, simulation, and/or experimentation. In some embodiments, as discussed in other sections, the distance can vary based on different factors such as the speed of the ADV, and/or the type of the moving obstacle. In other words, based on different circumstances, a different distance threshold may be applied.

If the distance is below the distance threshold, then the process proceeds to block 412. If not, then the process proceeds towards block 410. Thus, block 408 provides safety when delaying performance of a driving decision. For example, even when the ADV has low confidence (e.g., below the confidence threshold) that the sensed obstacle will interfere with the ADV, the ADV only delays the driving decision up until a distance threshold from the sensed obstacle, or anticipated area of contact. At this point, even though the confidence is low, to error on the side of caution, the ADV can make a driving decision (e.g., yield, stop, steer away, or overtake).

At block 410, the process includes performing a driving decision to reduce the risk of contact with the sensed obstacle. For example, ADV may yield (e.g., decelerate and/or brake) to allow a moving obstacle to pass the ADV, thereby reducing risk of contact between the ADV and the obstacle. In some situations, for example, when the risk of contact is within an immediate proximity to the ADV (e.g., 0-10 meters), and/or when the ADV cannot safely adjust its own path, the ADV may stop (e.g., brake, or decelerate and brake). In other situations, the driving decision can include adjusting a path of the ADV, by steering the ADV away from the obstacle. For example, the ADV can adjust its current path by changing lanes or steering slightly out of the way but remaining in the same lane to avoid the obstacle. In some other situations, the ADV may decide to overtake a moving obstacle. This can involve speeding up so that the ADV moves safely past a potential area of contact prior to the arrival of the obstacle, thereby obviating the risk of contact.

At block 412, the system will delay performance of the driving decision, rather than perform the decision. The system can delay performance of the decision until a subsequent driving cycle. In the subsequent driving cycle, the process can repeat itself by sensing the obstacle at block 402, determining a new confidence score of the sensed obstacle at block 404, and so on. In other words, the process can be repeated periodically (e.g., every driving cycle, or every few driving cycles).

In some situations, if a confidence score of the obstacle is low, the process might determine at a future driving cycle that obstacle is not really there, which could be caused by blockage and/or a false identification. In this case, no driving decision would be required.

In other situations, as the ADV moves farther along its path, the confidence score of an obstacle can increase, for example, the sensed data may more positively identify the obstacle. In the case of a moving obstacle, the trajectory of the obstacle can become more apparent in subsequent driving cycles, for example due to heading, velocity, acceleration of the obstacle, and/or type of the obstacle becoming more evident. Once the confidence score satisfies the confidence threshold, the ADV can perform the driving decision. The total time delay from the initial sensing of an obstacle is then decided by how many driving cycles have occurred where a) the confidence score was below the confidence threshold and b) where the distance between the ADV and the sensed obstacle is below the distance threshold.

It should be understood that blocks 406 and 408 are not necessarily performed in such an order, for example, block 408 can be performed prior to, or contemporaneous with block 406. In either case if a) the confidence score is below a confidence threshold, and b) a distance between the ADV and the potential point of contact with the sensed obstacle is below a distance threshold, then the process delays performance of a driving decision (at block 412). Otherwise, if either threshold is satisfied, the process performs the driving decision to reduce the risk of contact with the sensed obstacle (at block 410).

Figure 5:
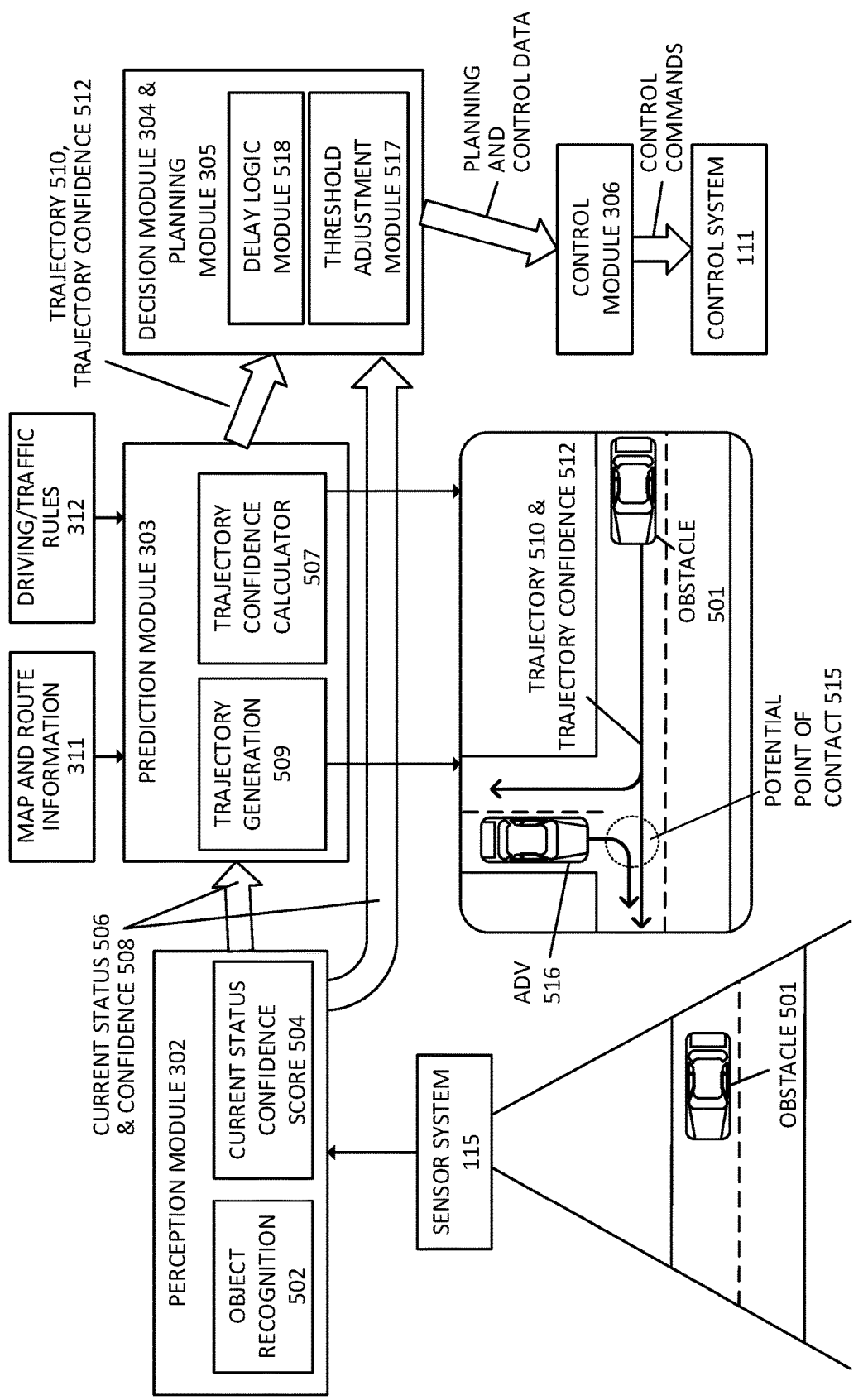
FIG. 5 shows a block diagram illustrating a process for delaying performance of a driving decision according to some embodiments.

Referring now to FIG. 5, a flow diagram is shown that describes features of process 400 (of FIG. 4) in some embodiments. At perception module 302, an obstacle 501 is sensed by sensor system 115. A confidence score is associated with the obstacle.

In some embodiments, the confidence score that is associated with the obstacle is a current status confidence score that indicates a confidence score of a collection of data known as a "current status" of the obstacle. The current status can include a speed, location, heading, acceleration, and/or a type of the moving obstacle (in this case a vehicle), the data being generated based on the sensor data and algorithms that interpret the sensor data. A confidence score associated with the current status can be determined based on numerous factors. In some embodiments, the confidence score of the current status is determined based on a distance between the ADV and the moving obstacle, the distance being determined by the sensor system. The further away the obstacle is, the less confidence can be given to sensing of the obstacle. Thus, although sensors of sensor system 115 might appear to sense the obstacle, when the obstacle is relatively far away (e.g., 30-50 meters), a distance factor may reduce the confidence score of the current status. As the distance between the obstacle and the ADV shrinks, the confidence score of the obstacle can increase because the sensors are closer to the obstacle and, as a result, the sensed data is presumably more reliable.

In some embodiments, the confidence score associated with the obstacle (e.g., a current status obstacle) is determined based on an object recognition accuracy. For example, an object recognition block 502 can utilize computer vision and machine learning algorithms such as a trained neural network that has been trained with data sets to recognize different types obstacles such as a vehicle, a pedestrian, a cyclist, a building, a tree, or debris. For example, images sensed by the sensor system 115 can be processed at object recognition block 502 to recognize moving obstacles in the images such as a vehicle (car, motorcycle, truck, etc.), a pedestrian, or a cyclist. Object recognition, however, is not perfect. Depending on the clarity of the images, or how recognizable a shape is of the obstacle based on past training data sets, the object recognition block can determine a score of how confident or reliable the recognition of an object is in those images. The score can help determine whether the recognition of the object is true or a false positive. Neural network APIs (e.g., Tensorflow Object Detection API) can be leveraged to provide various reliability metrics (e.g., PASCAL VOC 2010 detection metric, Weighted PASCAL VOC detection metric, PASCAL VOC 2010 instance segmentation metric, COCO detection metrics, COCO mask metrics, Open Images V2 detection metric, etc.) that indicate confidence of the object recognition.

Figure 6:
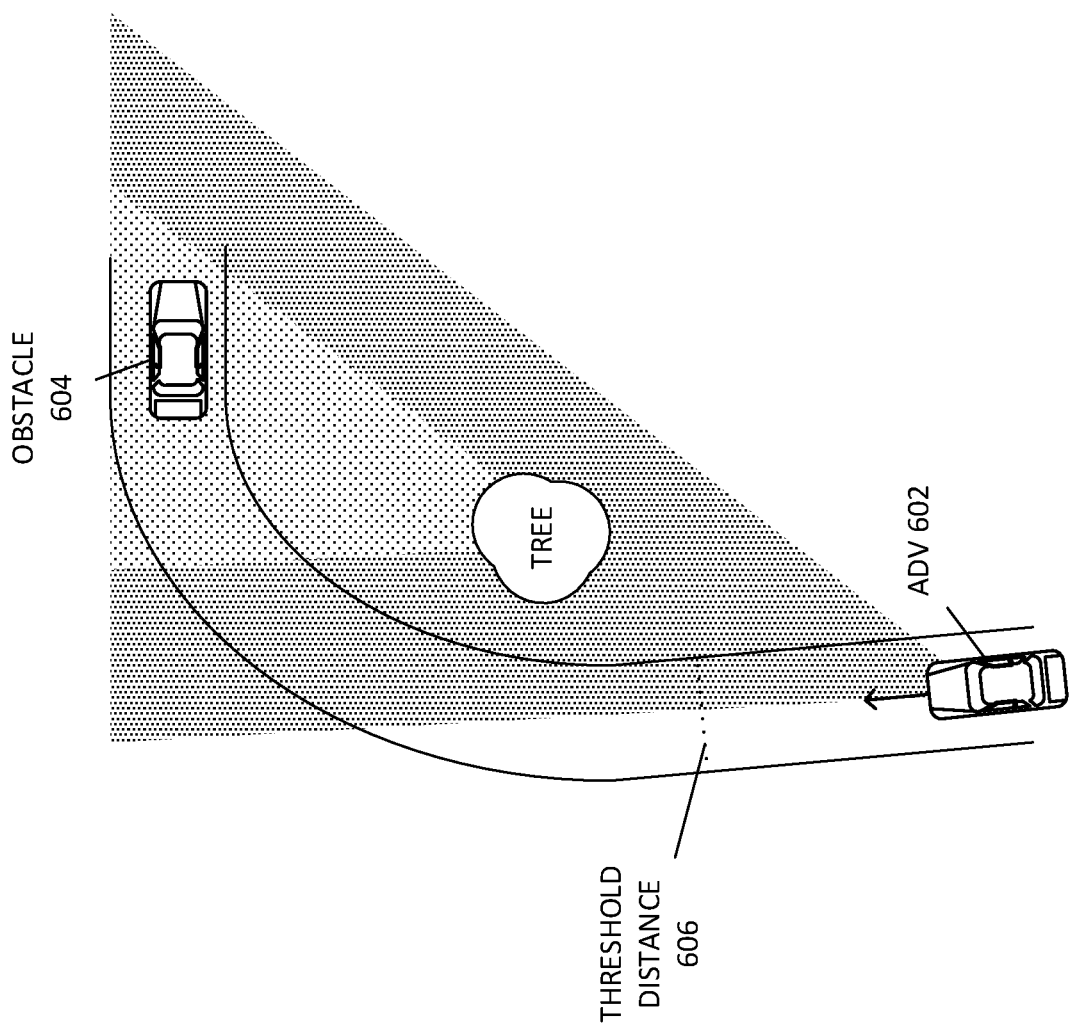
FIGS. 6-7 show examples of delaying performance of a driving decision, according to some embodiments.

In some embodiments, the confidence score is determined based on whether a line of sight between one or more sensors of the ADV and the sensed obstacle is at least partially blocked. For example, FIG. 6 shows an ADV 602 driving along a path. An object (e.g., a tree, building, other vehicle, mailbox, debris, etc.) can partially block an obstacle 604. Blockage of a moving obstacle can influence object recognition metrics. Additionally or alternatively to the object recognition metrics, the object recognition block 702 can add a penalty to the confidence score associated with the moving obstacle if it is at least partially blocked. The penalty can be increased or decreased depending on the amount of blockage (e.g., the greater the blockage, the higher the penalty). Thus, as blockage increases, the confidence score of the current status is reduced, and conversely, as blockage is reduced, the confidence score of the current status increases.

In some aspects, the confidence score associated with the obstacle is determined based further on the type of the moving obstacle, e.g., a vehicle, a pedestrian, or a cyclist. Sensing of current status information can be deemed more reliable based on different types of obstacles. For example, sensor information sensing a heading, speed, and location of the vehicle may be deemed more accurate than sensor information that senses heading, speed, and location of a pedestrian or cyclist due to their size, detectable surfaces, and speed differences. The ADV may require multiple frames to determine heading, speed, and/or acceleration. A vehicle may tend to have more constant heading, speed, and acceleration from one frame to the next, thus making the heading information more reliable than that of a pedestrian.

It should be understood that, throughout the present disclosure, factors described above (e.g., distance between ADV and obstacle, object recognition metrics, blockage, or type of obstacle) can increase or decrease confidence scores associated with a moving or stationary obstacle. The factors can be applied through arithmetic, e.g., addition, subtraction, multiplication, and/or division to increase or decrease the confidence score. As discussed, the current status and the associated confidence score can change frame-by-frame (from one driving cycle to another).

At block 504 a confidence score 508 can be determined based on one or more of the discussed factors and associated with the obstacle. If the obstacle is a stationary obstacle, the process can proceed to decision module 304 and planning module 305. If, however, the obstacle is a moving obstacle, the process can proceed to prediction module 303, which predicts how the obstacle will move.

At block 509, a trajectory of the obstacle is generated that predicts the obstacle's movement. The trajectory is generated based on map and route information 311, traffic rules 312, and the obstacle's current status. For example, traffic rules can be referenced to predict how the obstacle will move with respect to the map data (roads, intersections, sidewalks, etc.). If the obstacle is a vehicle, then one or more trajectories can be determined for the vehicle that predict where the vehicle will drive. As shown in the example in FIG. 5, map data might indicate an intersection ahead of the obstacle 501. Traffic rules can indicate that, in the obstacle's detected lane, the obstacle is allowed to travel straight or make a right turn. If the obstacle moves straight, this can interfere with the ADV 516. If, however, the trajectory turns right, then there is no interference with the ADV. In such a manner, one or more trajectories 710 can be generated to predict movement of the obstacle. A confidence score 512 can be generated at block 507 and associated with each trajectory of the vehicle. This confidence score describes a confidence that the ADV system has in the obstacle taking the corresponding trajectory.

In some embodiments, the process is only performed for trajectories where there is a risk of contact. In the example of FIG. 5, for example, a potential point of contact 515 is only associated with a straight trajectory of the obstacle 501. Thus, the trajectory where the obstacle turns right can be ignored (e.g., no driving decisions are made or delayed with regard to this trajectory).

At block 507, the confidence score of the trajectory of the obstacle can be determined based on a combination of factors including a) current status data (e.g., speed, location, heading, acceleration, type), b) a current status confidence score (determined at block 504) associated with a current status of the sensed obstacle, c) map data, and/or d) traffic rules. For example, if the confidence score of the current status of an obstacle is 80%, this can carry over as a baseline trajectory confidence score. The current status, trajectory of the obstacle, and map and traffic rules can be factors that determine the confidence score of the trajectory. Additional details regarding generation of a trajectory is further described in other sections.

Referring to obstacle 501 shown in FIG. 5, if the speed of the obstacle is high, and/or no deceleration is detected, then this may indicate that the obstacle intends to continue straight on the road, rather than turn right at the upcoming intersection. In such a case, the confidence score associated with the straight trajectory may be higher than the confidence score associated with the right turning trajectory. As indicated, in some embodiments, the trajectory confidence score is determined based on the map data (e.g., knowing where the sidewalks, intersections, roads, and/or lanes are) and the traffic rules (knowing what is allowed of each obstacle type on the given road, or intersection), as well as current status and obstacle type, all of which, when considered together, may indicate how the obstacle intends to move.

In another example, if a sensed obstacle is a pedestrian that is detected to be walking along a sidewalk, map data can specify where the sidewalk will end. Numerous trajectories of the pedestrian can be determined based on referencing the traffic rules. For example, a first trajectory can be generated so that the pedestrian is predicted to move across the sidewalk in a first direction, a second trajectory can be determined where the pedestrian moves across the sidewalk in a second direction, and a third trajectory can be determined where the pedestrian rounds the corner of the sidewalk and continues to walk on the sidewalk.

In some embodiments, the trajectory confidence score is determined based further on machine learning. For example, neural networks can be trained based on a plurality of training data indicating different situations such as vehicles, pedestrians, and/or cyclists approaching intersections at given headings, speeds, and accelerations. Other training data can indicate when an obstacle may be changing lanes or changing direction based on variations in heading, speed, and/or acceleration. Based on these trained neural networks, the current status data of the obstacle can be processed at block 509 to determine the confidence score of the trajectory of an obstacle. The trajectory and trajectory confidence can be processed by the decision module 304 and planning module 305.

At delay logic 518, if a) the confidence score associated with the sensed obstacle is below a confidence threshold, and b) the distance between the ADV and the potential point of contact with the obstacle is below a distance threshold, then the process can delay in making a driving decision. If the obstacle is a stationary obstacle, then the confidence score is a measure of confidence of the current status of the obstacle. In other words, the confidence score indicates how reliable the current status of the obstacle is. If the obstacle is moving, then the confidence score is associated with a trajectory of the obstacle, and can be described as a probability that the obstacle will take that particular trajectory.

At block 517, the distance threshold can be adjusted based on different factors such as speed of the ADV, speed of obstacle, or type of obstacle. For example, referring to FIG. 6, if the ADV 602 is going very fast, then the distance threshold 606 can be reduced (moved closer to the ADV) to allow the ADV more space to slow down or stop if deemed necessary. If the obstacle 604 is sensed to be reversing, this may further reduce the distance threshold. Further, if the type of the obstacle is a vehicle, this might further reduce the distance threshold, because vehicles can potentially move at a higher speed. Thus, in the unlikely scenario where the vehicle 604 accelerates (in reverse), the ADV would have reacted accordingly due to the reduced distance threshold. On the other hand, if the obstacle is a cyclist, or other obstacle that is slower than a vehicle, then the distance threshold adjustment for this type of obstacle would not be decreased as much as in the case of a vehicle, due to the vehicle's higher potential for speed.

Decision module 304 and planning module 305, in coordination with control module 306 and control system 111, can perform a driving decision to reduce risk of contact between the ADV and the obstacle. For example, decision and planning can adjust the path of the ADV, or decide to yield, stop, or overtake the object, resulting in planning and control data. Control module 306 uses the planning and control data to generate control commands such as steering, acceleration, and/or braking. These control commands are used by the control system 111 to generate movement of the ADV.

As shown, the same obstacle (e.g., obstacle 501) can have more than one predicted trajectory 510 (e.g., straight or turning). Thus, the process shown can be repeated for each trajectory that predicts a different movement of the sensed obstacle. Further, it should be understood that multiple obstacles can be processed concurrently. One or more trajectories are generated for each obstacle, each trajectory representing a predicted path that the obstacle might take, as shown in FIG. 7.

Figure 7:
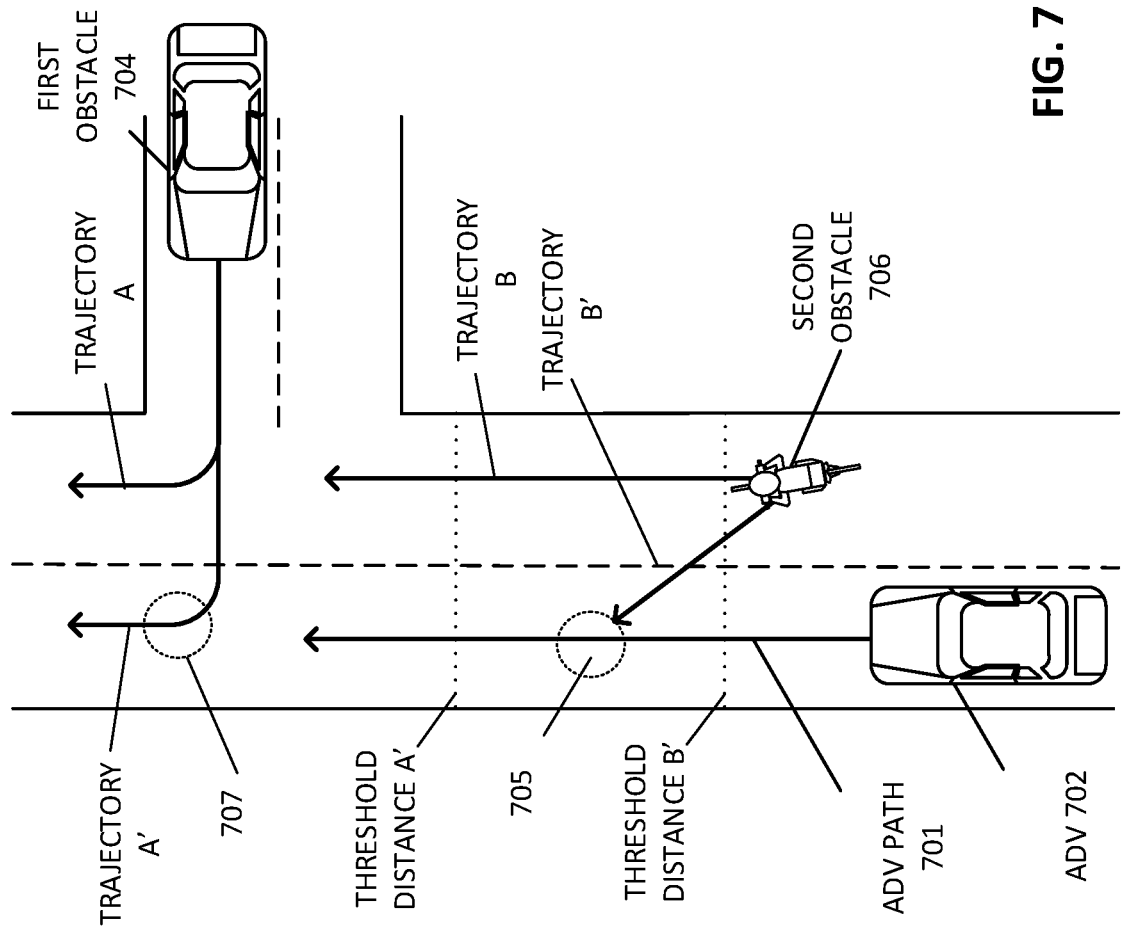

In FIG. 7, a first obstacle 704 has a trajectory A that predicts the first obstacle will turn right into a right lane, and trajectory A' that predicts the first obstacle will turn right into a left lane. Trajectory A does not interfere with a path 701 of ADV 702 because the ADV is in the left lane, however, Trajectory A' would put the first obstacle in the same lane as the ADV, thus creating a risk of contact at point of contact 707. If the confidence associated with trajectory A' is below the confidence threshold, then the ADV can delay making a driving decision (e.g., speeding up, slowing down, braking, or changing lanes). If the confidence is still below the threshold by the time that the ADV reaches the distance threshold A', then the ADV will perform the driving decision.

Simultaneously, a second obstacle 706 can have a trajectory B that predicts that the obstacle will remain straight, and a trajectory B' (different from trajectory B) that predicts that the obstacle will steer into the left lane. Trajectory B does not interfere with the ADV, however, trajectory B' creates a risk of contact at point 705 between the second obstacle and the ADV. If the confidence score associated with trajectory B' is below the confidence threshold, then the ADV can delay reacting to the second obstacle (e.g., making a driving decision), at least until the ADV reaches the distance threshold B'. At the distance threshold B', the ADV can perform the driving decision (e.g., slow down or stop) regardless of if the confidence score remains low. It should be noted however that, in some cases, while the ADV is delaying, a trajectory may be removed. For example, if the second obstacle changes heading to indicate that it will remain straight, or if the second obstacle stops completely, then trajectory B' can be discarded. In such a case, the ADV will no longer react to the second obstacle.

It should be understood that examples discussed in FIGS. 6-7 are meant to be illustrative rather than limiting. Numerous scenarios with different types of obstacles, roads, and interactions can be described that could create a risk of contact between the ADV and a sensed obstacle, all of which cannot be practically illustrated.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method of operating an autonomous driving vehicle (ADV), the method comprising:
   in a first driving cycle, performing operations including:
   determining an identification of an obstacle by analyzing sensor data captured by one or more sensors of the ADV using a neural network to implement computer vision;
   determining a confidence score for the obstacle that represents a confidence level of how reliable the computer vision is in correctly identifying the obstacle with the computer vision, wherein the confidence score is determined at least based on a detection metric obtained from the neural network through an application programming interface (API) of the neural network, and wherein the identification of the obstacle is lower in response to an increase in a distance between the ADV and the obstacle, and wherein the confidence score is reduced in response to a line of sight between the one or more sensors and the obstacle being at least partially blocked;
   generating a driving decision for the ADV based on a prediction of potential movement of the obstacle;
   in response to determining that the confidence score representing the confidence level of how reliable the computer vision is in correctly identifying the obstacle is below a predetermined confidence threshold and a distance between the ADV and a potential point of contact with the obstacle is greater than a predetermined distance threshold, delaying executing the driving decision for a period of time; and otherwise planning a path to drive the ADV based on the driving decision and providing a command to a vehicle control system which drives the ADV according to the path without delay; and in a second driving cycle, repeating the operations performed in the first driving cycle, wherein in response to determining that a second confidence score representing the confidence level of how reliable the computer vision is in correctly identifying the obstacle during the second driving cycle is not below the predetermined confidence threshold, planning the path to drive the ADV based on the driving decision and providing the command to the vehicle control system which drives the ADV according to the path without additional delay.

2. The method of claim 1, further comprising:
determining that the obstacle is a static obstacle based on the sensor data;
determining a current status of the obstacle; and
calculating the confidence score further based on the current status of the obstacle.

3. The method of claim 2, wherein the current status of the obstacle comprises one or more of a speed of the obstacle or a type of the obstacle.

4. The method of claim 1, further comprising:
determining that the obstacle is a dynamic obstacle based on the sensor data;
predicting a moving trajectory of the obstacle based on moving history of the obstacle; and
calculating the confidence score further based on the moving trajectory of the obstacle.

5. The method of claim 4, wherein the confidence score is calculated further based on a current status of the obstacle.

6. The method of claim 1, wherein the driving decision is a yield decision to slow down the ADV.

7. The method of claim 1, wherein the driving decision is a stop decision to stop the ADV.

8. A non-transitory machine-readable medium having instructions stored therein, which when executed by a processor, cause the processor to perform operations of operating an autonomous driving vehicle (ADV), the operations comprising:
in a first driving cycle,
determining an identification of an obstacle by analyzing sensor data captured by one or more sensors of the ADV using a neural network to implement computer vision;
determining a confidence score for the obstacle that represents a confidence level of how reliable the computer vision is in correctly identifying the obstacle with the computer vision, wherein the confidence score is determined at least based on a detection metric obtained from the neural network through an application programming interface (API) of the neural network, and wherein the identification of the obstacle is lower in response to an increase in a distance between the ADV and the obstacle, and wherein the confidence score is reduced in response to a line of sight between the one or more sensors and the obstacle being at least partially blocked;
generating a driving decision for the ADV based on a prediction of potential movement of the obstacle;

in response to determining that the confidence score representing the confidence level of how reliable the computer vision is in correctly identifying the obstacle is below a predetermined confidence threshold and a distance between the ADV and a potential point of contact with the obstacle is greater than a predetermined distance threshold, delaying executing the driving decision for a period of time;

otherwise planning a path to drive the ADV based on the driving decision and providing a command to a vehicle control system which drives the ADV according to the path without delay; and in a second driving cycle, repeating the operations performed in the first driving cycle, wherein in response to determining that a second confidence score representing the confidence level of how reliable the computer vision is in correctly identifying the obstacle during the second driving cycle is not below the predetermined confidence threshold, planning the path to drive the ADV based on the driving decision and providing the command to the vehicle control system which drives the ADV according to the path without additional delay.

9. The machine-readable medium of claim 8, wherein the operations further comprise:
determining that the obstacle is a static obstacle based on the sensor data;
determining a current status of the obstacle; and
calculating the confidence score further based on the current status of the obstacle.

10. The machine-readable medium of claim 9, wherein the current status of the obstacle comprises one or more of a speed of the obstacle or a type of the obstacle.

11. The machine-readable medium of claim 8, wherein the operations further comprise:
determining that the obstacle is a dynamic obstacle based on the sensor data;
predicting a moving trajectory of the obstacle based on moving history of the obstacle; and
calculating the confidence score further based on the moving trajectory of the obstacle.

12. The machine-readable medium of claim 11, wherein the confidence score is calculated further based on a current status of the obstacle.

13. The machine-readable medium of claim 8, wherein the driving decision is a yield decision to slow down the ADV.

14. The machine-readable medium of claim 8, wherein the driving decision is a stop decision to stop the ADV.

15. A data processing system, comprising:
a processor; and
a memory coupled to the processor to store instructions, which when executed by the processor, cause the processor to perform operations of operating an autonomous driving vehicle (ADV), the operations including:
in a first driving cycle,
determining an identification of an obstacle by analyzing sensor data captured by one or more sensors of the ADV using a neural network to implement computer vision;
determining a confidence score for the obstacle that represents a confidence level of how reliable the computer vision is in correctly identifying the obstacle with the computer vision, wherein the confidence score is determined at least based on a detection metric obtained from the neural network through an application programming interface (API) of the neural network, and wherein the identification of the obstacle is lower in response to an increase in a distance between the ADV and the obstacle, and wherein the confidence score is reduced in response to a line of sight between the one or more sensors and the obstacle being at least partially blocked, generating a driving decision for the ADV based on a prediction of potential movement of the obstacle, in response to determining that the confidence score representing the confidence level of how reliable the computer vision is in correctly identifying the obstacle is below a predetermined confidence threshold and a distance between the ADV and a potential point of contact with the obstacle is greater than a predetermined distance threshold, delaying executing the driving decision for a period of time, otherwise planning a path to drive the ADV based on the driving decision and providing a command to a vehicle control system which drives the ADV according to the path without delay, and in a second driving cycle, repeating the operations performed in the first driving cycle, wherein in response to determining that a second confidence score representing the confidence level of how reliable the computer vision is in correctly identifying the obstacle during the second driving cycle is not below the predetermined confidence threshold, planning the path to drive the ADV based on the driving decision and providing the command to the vehicle control system which drives the ADV according to the path without additional delay.

16. The system of claim 15, wherein the operations further comprise:
 determining that the obstacle is a static obstacle based on the sensor data;
 determining a current status of the obstacle; and
 calculating the confidence score further based on the current status of the obstacle.

17. The system of claim 16, wherein the current status of the obstacle comprises one or more of a speed of the obstacle or a type of the obstacle.

18. The system of claim 15, wherein the operations further comprise:
 determining that the obstacle is a dynamic obstacle based on the sensor data;
 predicting a moving trajectory of the obstacle based on moving history of the obstacle; and
 calculating the confidence score further based on the moving trajectory of the obstacle.

19. The system of claim 18, wherein the confidence score is calculated further based on a current status of the obstacle.

20. The system of claim 15, wherein the driving decision is a yield decision to slow down the ADV.

21. The system of claim 15, wherein the driving decision is a stop decision to stop the ADV.

* * * * *